Patented Jan. 23, 1951

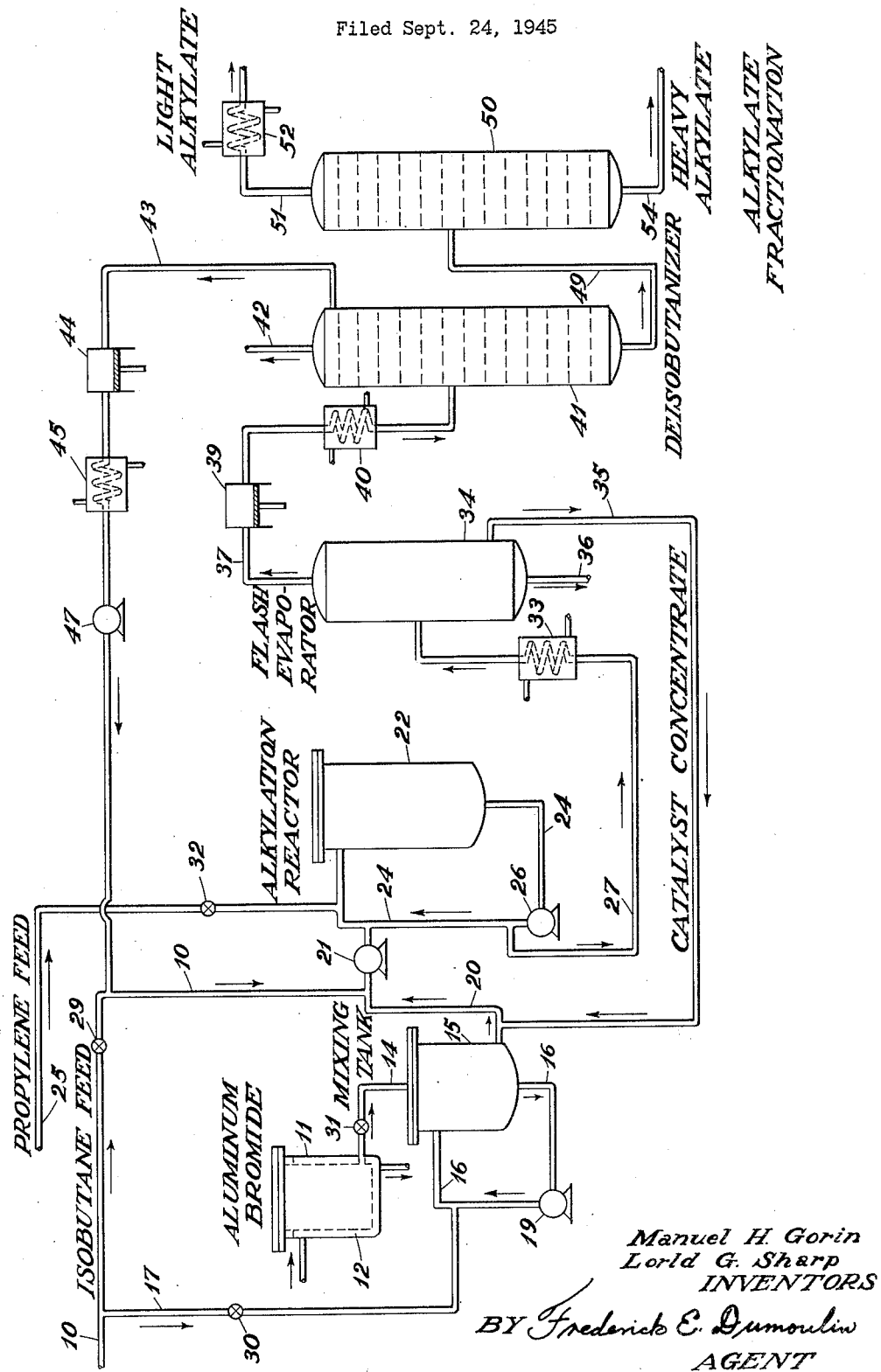

2,539,350

UNITED STATES PATENT OFFICE 2,539,350

ALKYLATION PROCESS

Manuel H. Gorin and Lorld G. Sharp, Dallas, Tex., assignors, by mesne assignments, to Socony-Vacuum Oil Company, Incorporated, New York, N. Y., a corporation of New York Application September 24, 1945, Serial No. 618,324

7 Claims. (Cl. 260—683.4)

This invention relates to alkylation and relates more particularly to the alkylation of isobutane with propylene in the presence of aluminum bromide catalyst.

As is well known, low boiling isoparaffins can be alkylated with low boiling olefins in the presence of suitable catalytic agents to produce saturated hydrocarbons which, because of their volatility characteristics, lead susceptibilities, and anti-knock ratings, are highly desirable as aviation gasoline or high quality motor fuel. While isopentane may be employed for the production of alkylate hydrocarbons of gasoline boiling range, isobutane is more commonly employed not only because of its availability but also because isopentane is itself a valuable component of aviation gasoline and high quality motor fuel. Hydrofluoric acid and sulfuric acid are the usual catalysts employed in commercial alkylation operations, and it is known that Friedel-Crafts catalysts will catalyze the alkylation of isoparaffins with olefins. Attempts to employ aluminum bromide as a catalyst for the alkylation of isobutane with propylene, however, have not been successful from the standpoint of commercial operations because of the fact that this olefin polymerizes rather readily in the presence of aluminum bromide catalyst. The polymerization reaction tends to be the predominant reaction, not infrequently to the total exclusion of the alkylation reaction, and, consequently, very high yields of products boiling above the gasoline boiling range and very low yields of alkylate products boiling within the gasoline boiling range are obtained from isobutane and propylene when employing this catalyst.

It is an object of this invention to provide a process for the alkylation of isobutane with propylene in the presence of aluminum bromide catalyst. It is another object of this invention to provide a process for the alkylation of isobutane with propylene in the presence of aluminum bromide catalyst whereby high yields of alkylate product of aviation gasoline or motor fuel boiling range are obtained. It is another object of this invention to provide a process for obtaining high yields of high octane rating alkylate product by alkylation of isobutane with propylene in the presence of aluminum bromide catalyst. It is another object of this invention to provide a process for the alkylation of isobutane with propylene in the presence of aluminum bromide catalyst whereby substantial suppression of propylene polymerization may be effected. Further objects and advantages of the invention will become apparent from the following description thereof.

In accordance with the invention, isobutane is alkylated with propylene, in the presence of aluminum bromide catalyst dissolved in a saturated hydrocarbon, by a process which involves as its essential step the employment of a predetermined minimum concentration of dissolved aluminum bromide catalyst, which concentration is a function of the temperature at which the alkylation reaction is carried out. We have discovered that, in the alkylation of isobutane with propylene in the presence of aluminum bromide catalyst, for each temperature of alkylation there is a concentration of dissolved aluminum bromide catalyst, based upon the amount of isobutane employed, which is critical with respect to the character of the reaction products obtained. Below this concentration, reaction products boiling above the aviation gasoline or motor fuel boiling range are obtained almost exclusively while above this concentration at least 70 weight per cent of the total reaction product consists of saturated hydrocarbons of high octane rating boiling within the aviation gasoline boiling range, i. e., boiling between 80° F. and 356° F. By total reaction product we mean the product obtained after removal of unreacted isobutane and lower boiling compounds from the reaction mixture. This minimum concentration of catalyst, we have discovered, is expressed by the relationship $$t = \frac{15}{c} - 4$$

where $t$ is the average temperature in degrees centigrade at which the reaction is carried out and $c$ is the concentration of dissolved aluminum bromide in weight per cent based upon the amount of isobutane reactant employed. It is an essential feature of the process that the aluminum bromide is employed in the form of a solution since thereby control of the concentration of catalyst is obtained.

In carrying out the invention, in accordance with one embodiment, isobutane in the liquid phase, containing aluminum bromide dissolved therein in a concentration determined, according to the above expression, by the temperature of alkylation, is contacted with propylene in a reactor of any suitable type wherein agitation may be effected. The reaction mixture, after removal from the reactor, is treated for recovery and recycling of the dissolved aluminum bromide catalyst and recovery and recycling of the excess isobutane reactant. Thereafter, the remainder of the reaction products is treated for separation of aviation alkylate or motor fuel alkylate products from heavy alkylate products.

The expression $$t = \frac{15}{c} - 4$$

indicates the minimum concentration of dissolved aluminum bromide to be employed for each temperature of alkylation, but, ordinarily, it is desirable to employ higher concentrations of aluminum bromide since, as it has been found, the use of higher concentrations of aluminum bromide results in increased yields of aviation alkylate. Preferably, concentrations of dissolved aluminum bromide about twice as great as those given by the expression are employed. However, it has also been found that, with high concentrations of dissolved aluminum bromide, the catalyst tends to be consumed, as by the formation of tars, for example, and the cost of the alkylate product is thereby increased. Thus, economic considerations will govern the maximum concentration to be employed for any given temperature of operation. Ordinarily, concentrations of dissolved aluminum bromide in excess of about 5 weight per cent of the isobutane are neither necessary nor desirable.

The reaction is carried out under sufficient pressure to maintain at least the isobutane reactant in the liquid phase. Where the pressure is such that only the isobutane will be maintained in the liquid phase, the propylene may be added to the reaction zone in the gaseous phase. However, the pressure may be sufficiently high to maintain the propylene feed in the liquid phase where the temperature employed is below the critical temperature of the propylene feed stream, in which case the propylene will be added to the reaction zone in the liquid phase. Higher pressures may be employed as desired although excessive pressures are unnecessary.

Alkylation temperatures will be between about 20° C. and 100° C., and it is preferred to employ temperatures between about 30° C. and 70° C. Since the isobutane is maintained in the liquid phase, comparatively high pressures are required to maintain this reactant in the liquid phase at temperatures above 100° C. At temperatures below 20° C., while yields of aviation boiling alkylate of at least 70 weight per cent of the total reaction products may be obtained by employing catalyst concentrations given by the expression, comparatively high concentrations of catalyst will be required. Additionally, rigorous cooling conditions are required to maintain the desired temperature. At a temperature of 20° C., the minimum concentration of aluminum bromide to be employed as indicated by the expression $$t = \frac{15}{c} - 4$$

will be about 0.63 weight per cent and, at a temperature of 100° C., will be about 0.14 weight per cent. At 30° C., the concentration will be about 0.44 weight per cent and, at 70° C., will be about 0.20 weight per cent.

The reaction may be carried out as a continuous operation or as a batch operation. Commonly, in isoparaffin-olefin alkylation reactions, it is desirable to maintain an excess of isoparaffin over olefin in the reaction zone, and in the present process conventional isoparaffin-olefin ratios may be employed. Thus, where the reaction is carried out as a continuous operation, external mol ratios of isobutane to propylene, i. e., mol ratios of isobutane to propylene fed to the reaction zone, between about 4 to 1 and 20 to 1 may be employed. However, in the present process, while conventional isoparaffin-olefin ratios may be employed, it is necessary to maintain the olefin in the reaction zone at any moment at a low concentration with respect to the other components of the reaction mixture in order to prevent formation of unduly large amounts of high boiling polymer reaction products. Stated otherwise, the instantaneous olefin concentration in the reaction mixture must be kept at a low value. This may be accomplished by maintaining a large volume of reaction mixture in the reaction zone relative to the rate at which the propylene is fed to the reactor. Since the residence time in the reactor, for any given feed rate of reactants, is related to the volume of reaction mixture maintained in the reactor, a large volume of reaction mixture relative to the rate of propylene feed may be effected by employing fairly long residence times. Satisfactory results, we have found, may be obtained by employing residence times of about 60 minutes with an external isobutane-propylene mol ratio of about 4 to 1. With an external isobutane-propylene mol ratio of about 8 to 1, residence times of about 35 minutes may be employed. With higher external ratios, correspondingly shorter residence times may be employed. The extent of agitation is an important factor in maintaining the instantaneous olefin concentration at a low value and the residence times mentioned are those found satisfactory where the extent of agitation is that ordinarily obtained in packed reactors, loop type reactors, or reactors equipped with agitation means such as stirrers. Where a very high degree of agitation is obtained, shorter residence times may be employed. Increase in catalyst concentration over the concentration given by the expression $$t = \frac{15}{c} - 4$$

results in an increased yield of aviation alkylate, as hereinabove mentioned. Thus, for any given yield of aviation alkylate a shorter residence time may be employed if the catalyst concentration is increased. Additionally, for any given yield and for any given catalyst concentration, a shorter residence time may be employed if the temperature is increased, since, as the expression indicates, the concentration of catalyst to be employed is inversely proportional to the temperature. Of course, longer residence times may be employed if desired. The alkylation reaction is a rapid reaction, occurring within a matter of seconds or fractions of a second, and therefore the considerations with respect to residence times mentioned above have reference only to obtaining a proper low instantaneous concentration of propylene in the reaction mixture.

Where batch operation is employed, the propylene may be fed to an alkylation reaction zone containing therein the isobutane and dissolved aluminum bromide, and the same considerations with respect to isobutane-propylene ratio and instantaneous olefin concentration apply as in continuous operation. Thus, satisfactory results have been obtained by feeding propylene to the isobutane at a rate of about 0.3 mol of propylene per hour per mol of isobutane.

Satisfactory agitation may be obtained by employing turbo mixers, stirrers, etc. Lower propylene addition rates may be employed if desired, and higher propylene addition rates may be employed where the reaction is carried out under conditions of higher catalyst concentration, high temperatures, or high degrees of agitation, as mentioned above in connection with continuous operation.

The surface-volume ratio appears to have some effect in increasing the yield of alkylate product of aviation gasoline boiling range, and it is therefore desirable to have appreciable surface area within the reactor. This may be accomplished, for example, by employing packing such as Raschig rings within the reactor. Satisfactory results have been obtained by providing surface-volume ratios of about 10 reciprocal feet, i. e., about 10 square feet of surface per cubic foot of reaction mixture.

In the practice of the invention, the aluminum bromide catalyst is dissolved in the isobutane reactant prior to admixture with the propylene. If desired, the aluminum bromide may be dissolved in any type of saturated hydrocarbon solvent, such as normal butane or other hydrocarbon inert with respect to the alkylation reaction and this solution admixed with the isobutane in the reaction mixture, but it is preferred to avoid the use of such solvents in order to simplify the later procedures of recovery of aluminum bromide catalyst and recovery of excess isobutane reactant and desired alkylate product. The aluminum bromide may be dissolved in a portion of the isobutane reactant to produce a relatively concentrated solution and this relatively concentrated solution then admixed with the remainder of the isobutane reactant, or the aluminum bromide may be dissolved directly in the entire portion of isobutane reactant. While aluminum bromide is relatively soluble in isobutane and other saturated hydrocarbon solvents, the solid compound is difficult to handle, and it is preferred to dissolve it by first melting the solid compound by heating to a temperature of about 98° C. and thereafter admixing while in the molten state with the isobutane, preferably in a closed chamber.

The accompanying drawing is a flow sheet diagrammatically illustrating one method of carrying out the process of the invention.

Referring now to the drawing, isobutane in the liquid state is fed to the system through line 10. Solid aluminum bromide in heating vessel 11 is melted by passing steam through jacket 12 and the molten aluminum bromide is passed through line 14 to mixing tank 15. A portion of the isobutane from line 10 enters circulating line 16 through line 17 and then passes to mixing tank 15 wherein the molten aluminum bromide is dissolved in the isobutane. Agitation to assist solution of the aluminum bromide is provided by continuously passing the mixture in tank 15 through circulating line 16 provided with pump 19. The aluminum bromide-isobutane solution leaves tank 15 through line 20 and is pumped by means of pump 21 to alkylation reactor 22 through circulating line 24. The remainder of the isobutane feed from line 10 enters the circulating line 24 through line 20. Propylene in the liquid state enters the system through line 25 and is also passed into circulating line 24. Proper admixture of the propylene and aluminum bromide-isobutane solution in alkylation reactor 22 is obtained by continuous circulation through the line 24 provided with pump 26. Suitable temperature control means (not shown) may be employed in connection with alkylation reactor 22 in order to maintain the temperature therein at a desired level. Alkylation reaction products are continuously withdrawn from the reactor through line 27 connected to the circulating line 24.

Isobutane feed line 10 and line 17 are provided with control valves 29 and 30 respectively, and aluminum bromide line 14 is provided with control valve 31 in order to proportion the amount of isobutane and aluminum bromide admixed together and thereby obtain the desired concentration of aluminum bromide in the isobutane charge in accordance with the invention. Propylene feed line 25 is provided with control valve 32 to control the ratio of isobutane to propylene fed to the reactor.

Alkylation reaction products pass through line 27 wherein they are heated by means of heater 33 to supply sufficient heat for vaporization in flash evaporator 34. The evaporator 34 is maintained at a low pressure and the lower boiling components of the alkylation reaction mixture flash to the vapor phase upon entering the evaporator while the heavier components remain in the liquid phase. The dissolved aluminum bromide is concentrated in the liquid phase and is removed from the evaporator through line 35 and recycled to the alkylation reactor 22. Heavy hydrocarbons and tar which may be formed during the alkylation reaction settle to the bottom of the evaporator and are removed through line 36. Aluminum bromide may be recovered from the tar for reuse in the alkylation reaction by any suitable procedure such as by destructive distillation of the tar as disclosed in U. S. Patent No. 2,348,770. The vaporized hydrocarbons consisting of excess isobutane reactant and light and heavy alkylate product pass from the top of the vaporizer through line 37, are condensed by compressing in compressor 39 and cooling in cooler 40, and are then passed to deisobutanizer 41 for separation of excess isobutane reactant and light gases from the alkylate product. Gases lighter than isobutane, which may have been contained in the feed stocks, are illustrated as being removed from the top of the deisobutanizer 41 through line 42, although in commercial practice a separate fractionator (not shown) may be required for removal of these gases. Isobutane is removed through line 43 and, after condensation by compressing in compressor 44 and cooling in cooler 45, pumped by means of pump 47 to line 10 for recycling to the alkylation reactor 22. The bottoms from deisobutanizer 41 are passed through line 49 to fractionator 50 where light alkylate product (aviation alkylate) is separated from heavy alkylate product. Where the isobutane feed to the system contains normal butane, the bottoms from the deisobutanizer 41 may be passed to a debutanizer (not shown) prior to passing to the fractionator 50 in order to remove the normal butane. This will not be required, however, where the feed does not contain normal butane since, under the temperature conditions and catalyst concentrations employed for the alkylation reaction, isomerization of the isobutane to normal butane will be imperceptible. The light alkylate is removed as overhead through line 51 provided with condenser 52 and heavy alkylate is removed as bottoms through line 54.

The flow sheet described above is merely diagrammatic and various equipment required for commercial operation such as accumulators, reflux lines, valves, additional heaters, compressors, etc., have not been illustrated. Provision for these, however, may be readily made by those skilled in the art.

The following examples will illustrate the results to be obtained by the process of the invention.

In Examples 1 to 5, batch operation was employed. Propylene in the gaseous state was added to isobutane having aluminum bromide dissolved therein and contained in an enclosed pressure vessel. The vessel was provided with a jacket through which a heat transfer medium could be circulated, a high-speed stirrer, and a thermocouple well, and the inner surfaces of the vessel were coated with lead. During addition of propylene, the mixture within the vessel was vigorously stirred and the temperature of the reaction mixture was maintained substantially constant by passage of steam or cooling water through the jacket. After propylene addition was complete, the contents of the vessel were removed and treated for removal of aluminum bromide catalyst. The remainder of the reaction product was then deisobutanized and the dieisobutanized product fractionally distilled to recover aviation alkylate therefrom. The fraction of the total deisobutanized product boiling between 80° F. and 356° F. was considered to be aviation alkylate. The table gives the reaction condtions and results obtained.

TABLE I

| Example No. | 1 | 2 | 3 | 4 | 5 |
|---|---|---|---|---|---|
| Temp., °C | 20 | 30 | 38 | 49 | 85 |
| Concentration Of AlBr$_3$—Weight Per Cent Of Isobutane | 0.88 | 0.60 | 0.40 | 0.30 | 0.88 |
| Propylene Addition Rate—Mols Propylene Per Hour Per Mol Isobutane | 0.359 | 0.358 | 0.358 | 0.356 | 0.288 |
| Yield Of Aviation Alkylate—Weight Per Cent Of Total Deisobutanized Product | 73 | 76 | 75 | 87 | 97 |
| Yield Of Aviation Alkylate—Weight Per Cent Of Propylene Charged | 173 | 178 | 177 | 201 | 230 |
| Octane Rating Of Aviation Alkylate-F-3 Clear | 85.5 | 88.0 | 88.0 | 87.5 | 82.6 |

*Example 6*

In this example, a continuous reactor was employed. A stream of propylene of 97 weight per cent purity, and a stream of isobutane of 99 weight per cent purity containing 0.8 weight per cent of aluminum bromide, were passed continuously to the reactor. The reactor consisted of an enclosed vessel packed with Raschig rings and agitation was provided by continuously circulating the reaction mixture through an external loop leading from the bottom to the top of the reactor. The external loop was provided with a heater to maintain the temperature of the reaction mixture at a constant level. Reaction mixture was continuously removed from the reactor and passed to a flash evaporator where isobutane and alkylate product were flashed off. Aluminum bromide concentrate was recycled to the reactor. The isobutane and alkylate product overhead from the evaporator were condensed and then subjected to fractionation to remove the isobutane which was recycled to the reactor. The bottoms from the fractionator were then fractionated to recover aviation alkylate (boiling point 80° F. to 356° F.) from heavy alkylate. Reaction conditions and results obtained are given in Table II.

TABLE II

| | |
|---|---|
| Temperature °C | 54 |
| Aluminum bromide concentration in isobutane weight per cent | 0.8 |
| External isobutane to propylene mol ratio | 11 to 1 |
| Residence time, minutes approximately | 49 |
| Yield of aviation alkylate in deisobutanized product weight per cent | 98 |
| Yield of aviation alkylate on basis of propylene charged weight per cent | 247 |
| F-3 clear octane number | 83.5 |
| F-3 octane number with 4.0 cc. of tetraethyl lead per gallon | 103.2 |
| F-4 index number with 4.0 cc. of tetraethyl lead per gallon | 116 |

In each of the examples a concentration of aluminum bromide in excess of the minimum concentration indicated by the expression $$t = \frac{15}{c} - 4$$

was employed. Thus, the minimum concentration in Examples 1, 2, 3, 4, 5, and 6 as given by the expression would be 0.63, 0.44, 0.36, 0.28, 0.17, and 0.25 weight per cent respectively. It will be noted that in Examples 5 and 6, a concentration of aluminum bromide in considerable excess of the minimum concentration indicated by the expression was employed and that yields of aviation alkylate of 97 and 98 weight per cent respectively of the total deisobutanized products were obtained.

It will be seen from the above tables that by the process of the invention high yields of aviation alkylate in the total alkylate product are obtained and also that high yields of aviation alkylate on the basis of the weight of propylene charged to the reactor are obtained.

The isobutane employed in the process may contain impurities such as normal butane, propane, pentane, etc., but it is desirable to employ isobutane in as pure state as is practicably obtained. However, where impurities such as normal butane are contained in the isobutane or such as propane are contained in the propylene, they will act as diluents in the reaction mixture and will have no appreciable effect provided they are not present in amounts greater than, say, about 10% by volume. Where normal paraffins are present in the isobutane feed in small amounts, the concentration of aluminum bromide to be employed may be based upon the weight of the isobutane plus the weight of the impurities.

While the process has been particularly described with reference to the alkylation of isobutane with propylene, the process is equally applicable to the alkylation of isobutane with other olefins having the same structural characteristics as propylene which readily polymerize in the presence of aluminum bromide catalyst. Such other olefins having the same structural characteristics as propylene are those having a straight chain and a double bond in a terminal position, such as butene-1, pentene-1, etc. The process of the invention is also applicable to the alkylation of isobutane with mixtures of these olefins. The straight chain olefins having the double bond in a non-terminal position, such as butene-2, pentene-2, etc., are not readily polymerized by aluminum bromide catalyst and therefore no particular problem, from the standpoint of polymerization, is involved in alkylating with these olefins in the presence of aluminum bromide catalyst. On the other hand, the branched chain olefins, such as isobutylene, tend to polymerize to a greater extent than the straight chain terminal bond olefins, and other process conditions will be required to obtain satisfactory yields of alkylate products.

Having thus described our invention, it is to be understood that such description has been given by way of illustration and example only and not by way of limitation, reference being had for the latter purpose to the appended claims.

We claim:

1. A process for producing saturated hydrocarbons of gasoline boiling range by the alkylation of isobutane with propylene comprising contacting propylene with isobutane at a temperature between about 20° C. and 100° C. in the presence of aluminum bromide catalyst dissolved in a saturated hydrocarbon in a concentration of at least 0.63 weight per cent but not exceeding 5 weight per cent of the isobutane whereby an alkylation reaction product containing at least 70 per cent of aviation gasoline boiling range hydrocarbons is obtained.

2. A process for producing saturated hydrocarbons of gasoline boiling range by the alkylation of isobutane with propylene comprising contacting propylene with isobutane at a temperature between about 30° C. and 70° C. in the presence of aluminum bromide catalyst dissolved in a saturated hydrocarbon in a concentration of at least 0.44 weight per cent but not exceeding 5 weight per cent of the isobutane whereby an alkylation reaction product containing at least 70 weight per cent of aviation gasoline boiling range hydrocarbons is obtained.

3. A process for producing saturated hydrocarbons of gasoline boiling range by the alkylation of isobutane with propylene comprising contacting propylene with isobutane containing dissolved aluminum bromide as the effective catalytic agent at a temperature between about 20° C. and 100° C. and a concentration of dissolved aluminum bromide not exceeding 5 per cent by weight but at least as great as the concentration given by the expression $$t = \frac{15}{c} - 4$$

where $t$ is the temperature of the reaction in degrees centigrade and $c$ is the concentration in weight per cent of aluminum bromide dissolved in the isobutane whereby a reaction product containing at least 70 weight per cent of aviation gasoline boiling range hydrocarbons is obtained.

4. A process for producing saturated hydrocarbons of gasoline boiling range by the alkylation of isobutane with propylene comprising contacting propylene with isobutane containing dissolved aluminum bromide as the effective catalytic agent at a temperature between about 20° C. and 100° C. and a concentration of dissolved aluminum bromide not exceeding 5 per cent by weight but at least twice as great as the concentration given by the expression $$t = \frac{15}{c} - 4$$

where $t$ is the temperature of the reaction in degrees centigrade and $c$ is the concentration in weight per cent of aluminum bromide dissolved in the isobutane whereby a reaction product containing at least 70 weight per cent of aviation gasoline boiling range hydrocarbons is obtained.

5. A process for producing saturated hydrocarbons of gasoline boiling range by the alkylation of isobutane with propylene whereby a reaction product containing at least 70 weight per cent of aviation gasoline boiling range hydrocarbons is obtained, comprising contacting in an alkylation reaction zone at a temperature between about 20° C. and 100° C. a propylene feed stock consisting predominantly of propylene with an isobutane feed stock consisting predominantly of isobutane and containing aluminum bromide dissolved therein as the effective catalytic agent in a concentration of about that given by the expression $$t = \frac{15}{c} - 4$$

where $t$ is the temperature of reaction in degrees centigrade and $c$ is the concentration in weight per cent of aluminum bromide dissolved in the isobutane feed stock.

6. A process for producing saturated hydrocarbons of gasoline boiling range by the alkylation of isobutane with propylene whereby a reaction product containing at least 70 weight per cent of aviation gasoline boiling rang hydrocarbons is obtained, comprising contacting in an alkylation reaction zone at a temperature between about 20° C. and 100° C. a propylene feed stock consisting predominantly of propylene with an isobutane feed stock consisting predominantly of isobutane and containing aluminum bromide dissolved therein as the effective catalytic agent in a concentration of about twice as great as that given by the expression $$t = \frac{15}{c} - 4$$

where $t$ is the temperature of reaction in degrees centigrade and $c$ is the concentration in weight per cent of aluminum bromide dissolved in the isobutane feed stock.

7. A process for producing saturated hydrocarbons of gasoline boiling range by the alkylation of isobutane with propylene whereby a reaction product containing at least 70 weight per cent of aviation gasoline boiling range hydrocarbons is obtained comprising contacting in an alkylation reaction zone at a temperature between about 20° C. and 100° C. a propylene feed stock consisting predominantly of propylene with an isobutane feed stock consisting predominantly of isobutane and containing aluminum bromide dissolved therein as the effective catalytic agent in a concentration between about one and two times as great as that given by the expression $$t = \frac{15}{c} - 4$$

where $t$ is the temperature of reaction in degrees centigrade and $c$ is the concentration in weight per cent of aluminum bromide dissolved in the isobutane feed stock.

MANUEL H. GORIN.
LORLD G. SHARP.

REFERENCES CITED

The following references are of record in the file of this patent:

UNITED STATES PATENTS

| Number | Name | Date |
|---|---|---|
| 2,057,432 | Ipatieff et al. | Oct. 13, 1936 |
| 2,320,293 | Ostergaard | May 25, 1943 |
| 2,342,865 | Ipatieff et al. | Feb. 29, 1944 |
| 2,361,368 | Evering et al. | Oct. 31, 1944 |
| 2,383,123 | Gorin | Aug. 21, 1945 |
| 2,401,925 | Gorin | June 11, 1946 |
| 2,412,143 | Gorin et al. | Dec. 3, 1946 |